US009275546B2

(12) United States Patent
Aravkin et al.

(10) Patent No.: US 9,275,546 B2
(45) Date of Patent: Mar. 1, 2016

(54) SYSTEM AND METHOD FOR MINIMIZING THE TIME TO PARK A VEHICLE

(71) Applicant: International Business Machines Corporation, Armonk, NY (US)

(72) Inventors: Aleksandr Y. Aravkin, Bronx, NY (US); Anirban Basu, Port Ewen, NY (US); Dimitri Kanevsky, Ossining, NY (US); Tara N. Sainath, New York, NY (US); Premal Y. Shah, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/193,750

(22) Filed: Feb. 28, 2014

(65) Prior Publication Data
US 2015/0248835 A1 Sep. 3, 2015

(51) Int. Cl.
B60Q 1/48 (2006.01)
G08G 1/14 (2006.01)

(52) U.S. Cl.
CPC . *G08G 1/14* (2013.01); *G08G 1/149* (2013.01)

(58) Field of Classification Search
CPC ..... G06Q 10/02; G06Q 10/0284; G08B 25/12
USPC ......... 340/932.2, 989, 995.1; 705/5, 7.35, 13, 705/28
See application file for complete search history.

(56) References Cited

U.S. PATENT DOCUMENTS

| | | | |
|---|---|---|---|
| 7,783,530 B2 * | 8/2010 | Slemmer et al. | 705/28 |
| 7,834,778 B2 | 11/2010 | Browne et al. | |
| 8,306,734 B2 | 11/2012 | Mathews | |
| 8,671,002 B2 * | 3/2014 | Stefik et al. | 705/5 |
| 2005/0280555 A1 | 12/2005 | Warner | |
| 2008/0048885 A1 | 2/2008 | Quinn | |
| 2010/0302067 A1 * | 12/2010 | Goldman et al. | 340/932.2 |
| 2011/0106425 A1 | 5/2011 | Trum et al. | |
| 2012/0062395 A1 | 3/2012 | Sonnabend et al. | |
| 2012/0161986 A1 | 6/2012 | Amir | |
| 2012/0200430 A1 | 8/2012 | Spahl | |
| 2012/0203600 A1 | 8/2012 | Fiorucci et al. | |
| 2012/0262305 A1 | 10/2012 | Woodard et al. | |
| 2013/0290045 A1 * | 10/2013 | Levy et al. | 705/5 |
| 2014/0372155 A1 * | 12/2014 | Wang et al. | 705/5 |

FOREIGN PATENT DOCUMENTS

| | | | |
|---|---|---|---|
| EP | 2267681 A1 | 12/2010 | |
| JP | 2004342013 A | 12/2004 | |

OTHER PUBLICATIONS

IBM, "Azimuthal Distance Sensor for Provision of Parking Assistance," ip.com, IPCOM000051634D, Feb. 2005, 3 pages.

* cited by examiner

*Primary Examiner* — Tai T Nguyen
(74) *Attorney, Agent, or Firm* — Louis J. Percello; Ryan, Mason & Lewis, LLP

(57) ABSTRACT

Systems and methods for providing a user with information on spaces in which to park a vehicle are provided. A method for providing a user with information on spaces in which to park a vehicle, comprises identifying one or more spaces in which to park the vehicle, selecting valid spaces from the identified one or more spaces based on a validation criteria, and ranking the valid spaces and providing a ranked list of the valid spaces to the user, wherein the identifying, selecting, ranking and providing steps are performed by a computer system comprising a memory and at least one processor coupled to the memory.

20 Claims, 2 Drawing Sheets

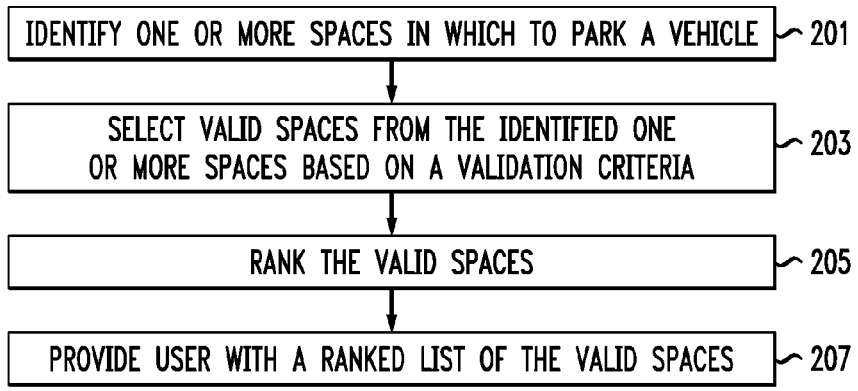
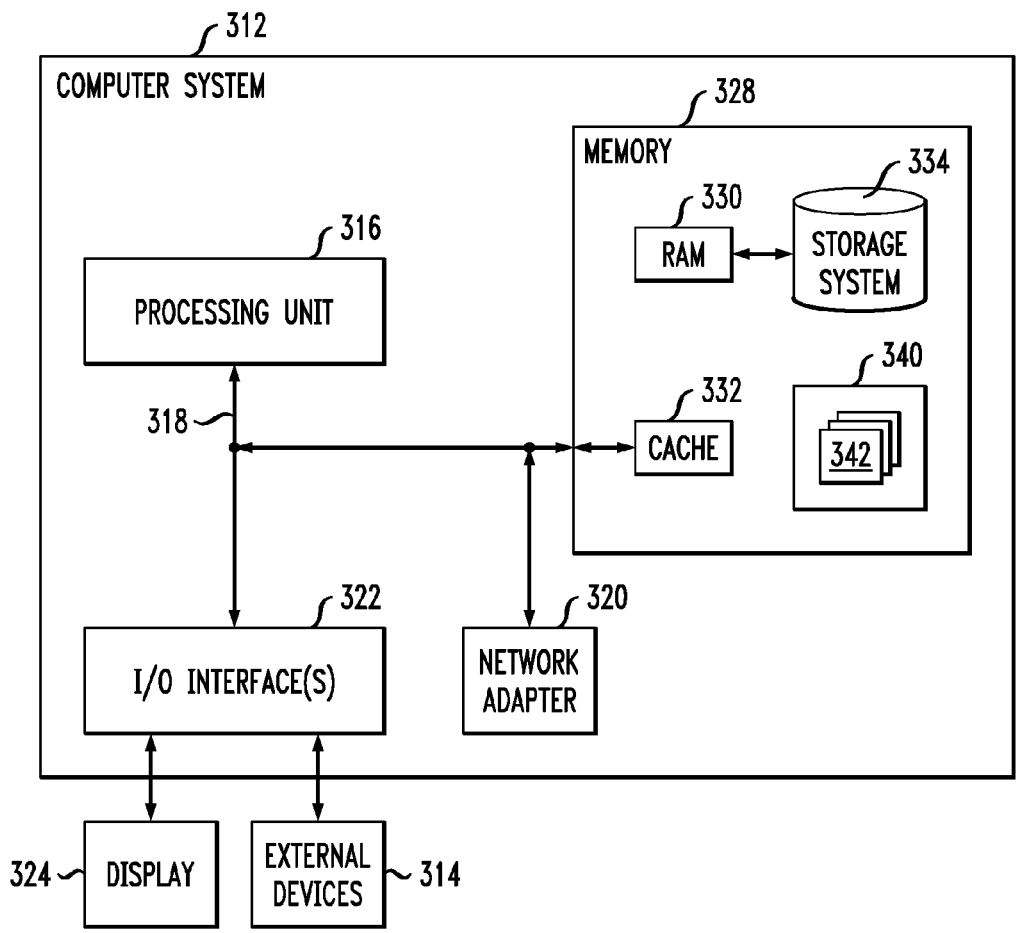

SYSTEM AND METHOD FOR MINIMIZING THE TIME TO PARK A VEHICLE

TECHNICAL FIELD

The field generally relates to systems and methods for minimizing the time to park a vehicle and, in particular, systems and methods which provide feedback to a user/driver regarding the availability of a suitable space for the vehicle.

BACKGROUND

Looking for parking when in a vehicle, especially when parking on a street in a crowded city, can be a daunting and challenging task. There may be few parking spots available as there may be many vehicles already parked, and/or many spots with restricted parking, such as spots near school or loading zones or fire hydrants. In addition, certain spots may allow parking only at certain times of the day. Also, when there is an available spot, the spot might be too small for a first vehicle and/or a second vehicle may get to and take the spot before the first vehicle. Obstructions in the road (e.g., snow, construction, etc.) can further limit availability of parking spots.

Parking between vehicles with a small distance between the vehicles typically requires many repetitive movements in forward and backward directions before the vehicle being parked is placed in position between the other vehicles. The process of fitting a vehicle between other vehicles can be time consuming and may lead to damage to one more already parked vehicles, or to the vehicle being parked, due to bumping during the parking maneuvers.

Accordingly, there is a need for systems and methods which aid drivers with finding and securing parking spots for their vehicle so as to minimize the time to park a vehicle.

SUMMARY

In general, exemplary embodiments of the invention include systems and methods for minimizing the time to park a vehicle and, in particular, systems and methods for providing a user with information on spaces in which to park a vehicle.

According to an exemplary embodiment of the present invention, a system for providing a user with information on spaces in which to park a vehicle, comprises an availability module capable of identifying one or more spaces in which to park the vehicle, and capable of selecting valid spaces from the identified one or more spaces based on a validation criteria, and a ranking module capable of ranking the valid spaces and providing a ranked list of the valid spaces to the user.

According to an exemplary embodiment of the present invention, a method for providing a user with information on spaces in which to park a vehicle, comprises identifying one or more spaces in which to park the vehicle, selecting valid spaces from the identified one or more spaces based on a validation criteria, and ranking the valid spaces and providing a ranked list of the valid spaces to the user, wherein the identifying, selecting, ranking and providing steps are performed by a computer system comprising a memory and at least one processor coupled to the memory.

According to an exemplary embodiment of the present invention, a computer program product for providing a user with information on spaces in which to park a vehicle, comprises a computer readable storage medium having program instructions embodied therewith, the program instructions executable by a processor to cause the processor to perform a method comprising identifying one or more spaces in which to park the vehicle, selecting valid spaces from the identified one or more spaces based on a validation criteria, and ranking the valid spaces and providing a ranked list of the valid spaces to the user.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIG. 2 is a flow diagram of a method for providing a user with information on spaces in which to park a vehicle according to an exemplary embodiment of the invention.

FIG. 3 illustrates a computer system in accordance with which one or more components/steps of the techniques of the invention may be implemented, according to an exemplary embodiment of the invention.

DETAILED DESCRIPTION OF EXEMPLARY EMBODIMENTS

Figure 1:
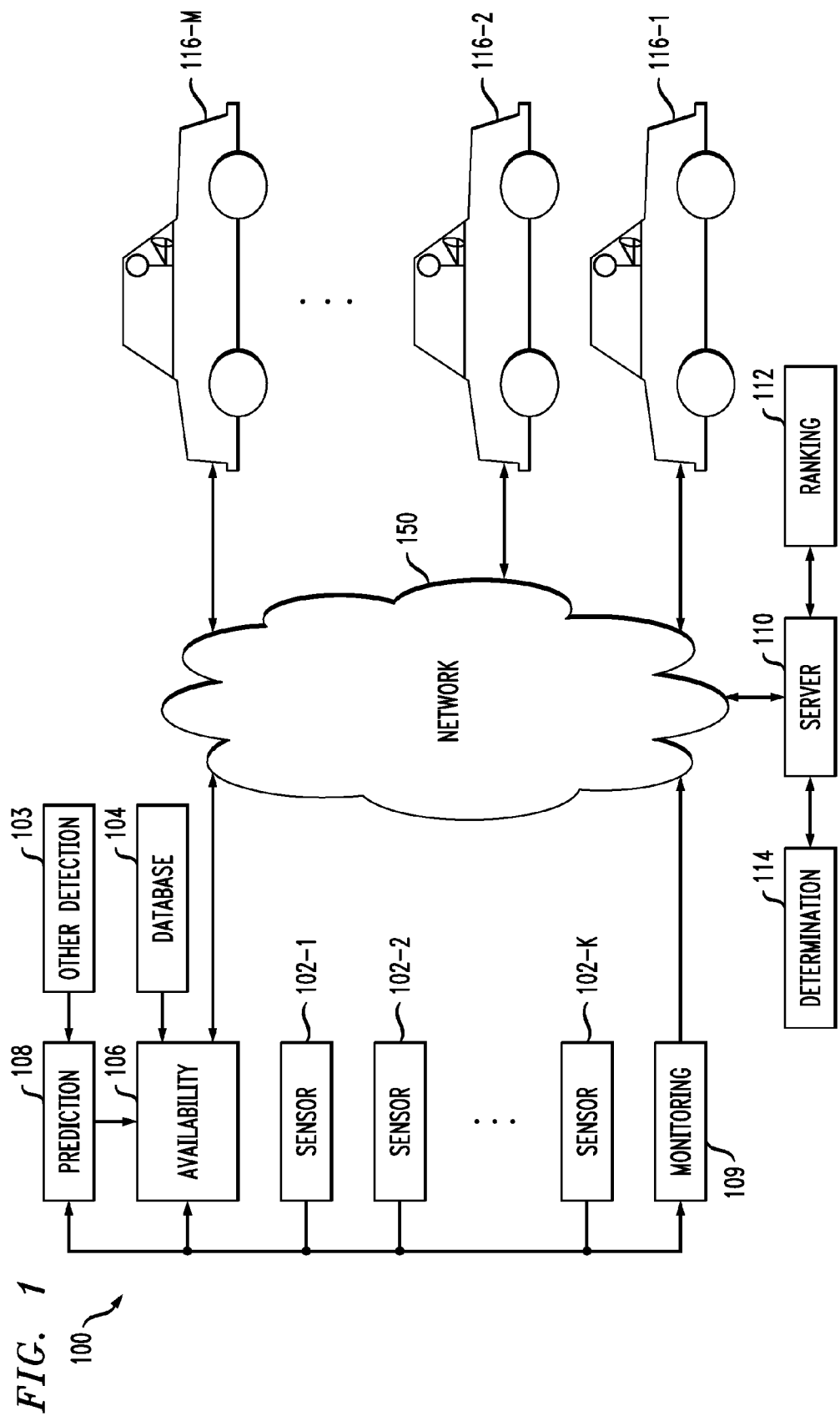
FIG. 1 is high-level diagram showing detail of a system for providing a user with information on spaces in which to park a vehicle according to an exemplary embodiment of the invention.

Exemplary embodiments of the invention will now be discussed in further detail with regard to systems and methods for minimizing the time to park a vehicle. This invention may, however, be embodied in many different forms and should not be construed as limited to the embodiments set forth herein.

Embodiments of the present invention include systems and methods which relate information to a driver or other vehicle occupant about available and unrestricted parking spots based on, for example, the dimensions of the driver's vehicle (e.g., a car, van, sport-utility vehicle (SUV), bus, truck, etc.), and the queue of other people looking for parking. The embodiments of the invention permit vehicles to go directly to the first available legal spot for a vehicle, which will be of adequate size, while avoiding or minimizing competition for spots with drivers in other vehicles.

In accordance with embodiments of the present invention, it is determined whether a parking spot is available and legal, whether a given vehicle can fit in that spot, and the number and order of arrival of cars that are looking for parking.

Referring to FIG. 1, which is a high-level diagram of a system 100 for providing a user with information on spaces in which to park a vehicle, according to an embodiment of the present invention, one or more sensors 102-1, 102-2, ... 102-K, including, but not limited to, video and/or still cameras, motion sensors, infrared sensors, and acoustic sensors, are placed in the vicinity of a plurality of parking spaces (e.g., on each street, road or avenue, in a parking lot). In accordance with an embodiment of the present invention, the sensors can be located and distributed in areas providing suitable vantage points, including, for example, higher altitude locations such as on lamp posts or on tall buildings. Each sensor scans a predetermined area to capture images, video, motion data, infrared data and/or acoustic data of available parking spots in that area.

For a particular location or area, the restricted spots, such as, for example, handicapped access spots, spots near school or loading zones or near fire hydrants, and/or spots that allow parking only at certain times of the day, will be known. In accordance with an embodiment, information regarding the restrictions, including the times at which parking in a particular spot may be restricted and/or allowed, can be inputted and stored in a database 104. In an embodiment, existing databases, such as, for example, traffic department records, may be accessible for parking restriction information.

A sensor 102 scanning a particular area can also capture images, video, motion data, infrared data and/or acoustic data of obstacles at parking spots, such as, for example, snow, flooding, downed trees, construction equipment, construction at location of the spot, broken pavement, etc. In accordance with an embodiment, based on the images, video, motion data, infrared data and/or acoustic data received from the sensors 102-1, 102-2, . . . 102-K, as well as the information regarding restrictions from the database 104, an availability module 106 can determine the number and size of available legal parking spots in a predetermined area. In accordance with an embodiment of the present invention, a sensor 102, such as a camera, can detect through, image recognition, for example, if there is a blockage, fire hydrant, another vehicle, or a vacancy at a particular parking spot. If there is an open space at a particular parking spot, the availability module determines the dimensions of the open space (e.g., width, length, clearance) using techniques including, but not limited to, image processing with geometric ratios, and/or processing of infrared and/or acoustic data.

The information from an availability module 106 for each of the predetermined areas is related back via a network 150 to a central server 110. The network 150 can include, for example, one or more of a wireless LAN (WLAN), wide area network (WAN), cellular network, satellite network and the Internet. The availability module 106 can include, for example, global positioning system (GPS) coordinates and/or specialized coding indicating the location of a predetermined area that the availability module 106 services.

In accordance with an embodiment, when users/drivers 116-1, 116-2, . . . 116-M enter an area, they can enter an application or other type of program on their electronic device, such as, for example, a smartphone, tablet, laptop, personal digital assistant (PDA) or device integrated into the vehicle, to indicate that they would like to find parking. The user's electronic device is connected to the central server 110 via the network 150, and, in accordance with an embodiment, includes location information of the user in the vehicle obtained by a GPS device or other location device (e.g., a location device in the user's electronic device or vehicle). The application can be preprogrammed to include the dimension information regarding the user's vehicle or information, such as, for example, the year, make, and model of the user's vehicle in order to retrieve the dimensions of the user's vehicle from a database. A user's vehicle information can be entered, for example, upon user registration with the application. Once the user/driver enters the application, the application can log into the central server 110 and provide the central server 110 with the user's location and vehicle information.

The central server 110 can also record requests from other users/drivers looking for parking in the same area, and a ranking module 112 can prioritize the users based on a time of arrival to the area, giving the highest priority to the user with the earliest arrival time. The ranking module 112 can provide this ranking information to a determination module 114 (described further below) to avoid a situation where two vehicles look to park in the same spot.

In accordance with an embodiment, given the availability module information, and the location, vehicle and priority information of a user, the determination module 114 (shown at the central server 110, but no necessarily limited to this arrangement) can determine where the closest available parking spot is for a user in which the user's vehicle can fit. In accordance with an embodiment, the application to which the user is logged on can relay the information about the closest available parking spot to the user's electronic device, or to a networked communication device that is part of the user's vehicle so the driver can proceed directly to the spot. The information provided to the user can include, for example, a description of the location of the available parking spot (e.g., street name, intersections, adjacent landmarks, other parked vehicles near the spot), and/or GPS coordinates corresponding to the available spot, which can be applied to driver's GPS to navigate driver to the spot. The information provided to the user can also include a note or warning regarding upcoming restrictions, such as, for example, a statement that parking is not allowed after a certain time.

In accordance with an embodiment of the present invention, when a subsequent user/driver looking for a parking spot comes into the same area as a prior user/driver who was also looking for a parking spot, based on a record of previous transactions, the determination module 114 will know if it has relayed information about a particular available spot to the prior user, and inform the subsequent user about the next closest available spot in order to prevent a conflict whereby two drivers are attempting to park in the same spot. As a result, a subsequent vehicle can go directly to the next available spot rather than interfering with the first vehicle.

In accordance with an embodiment of the present invention, the system further includes one or more prediction modules 108 capable of predicting when a vehicle may leave a parking spot by, for example, predicting a time when an owner of a parked vehicle may arrive and drive the vehicle from its parking spot. In other words, the prediction module 108 can predict an availability of a space that is not presently vacant. Predicting may be performed by recording a history of when users typically leave and/or return to a parking spot, and applying the history data, such as times and dates of return or departure, to, for example, a learning algorithm. Detecting some repetitive patterns of a user (e.g., when a person routinely leaves his/her apartment or office and uses the vehicle) can be performed using the sensors, or other detection devices 103, such as, for example, a smartphone, tablet, laptop or PDA and/or motion detectors distributed in buildings (e.g., offices, houses, apartments) and outside. The detected patterns can be analyzed in the prediction module 108 to build a predictive framework, which works in conjunction with the availability and determination modules 106 and 114 to assist in directing drivers to parking spots that may soon become free.

In accordance with an embodiment of the present invention, a predicted availability of a space that is not presently vacant is determined by monitoring user proximity to their vehicle and inferring intent. For example, if a vehicle is parked and a user is within a predetermined distance from the vehicle, the system 100 (e.g., prediction module 108) can predict that a spot in which the vehicle is parked will soon become available. According to an embodiment, if a user's keys or other user device (e.g., smartphone) have a GPS sensor tied to the system 100, presuming the keys are with the user, the system 100 can determine a distance of a user from his/her vehicle utilizing GPS data from the GPS sensor.

In accordance with an embodiment of the present invention, the system 100 can evaluate likelihood and imminence of spots becoming available. For example, if keys are within a predetermined distance from a vehicle as noted above, the system 100 can consider it more likely that the vehicle will move out of an occupied spot. Likelihood and imminence can also be measured by detecting the location of keys and/or a user within a building. For example, if the keys and/or the user are on a top floor of building, the system may determine that movement of a vehicle from a spot is less likely and less imminent.

According to an embodiment of the present invention, likelihood and imminence can be learned from historical data. For example, out of every 100 cases, the system 100 can determine how many and when (e.g., average time) spots became available (i.e., a vehicle was moved from a spot) after the keys and/or a user were within a predetermined distance from the vehicle. Such data can be obtained for frequently encountered heuristics.

In accordance with an embodiment of the present invention, the system can use a score based method for differentiating between multiple spots that are predicted to become vacant between a first time (time A) and a second time (time B). The score based method can be based on user preferences and correspond to the following formula (1):

$$\text{Score} = (w1 \times \text{likelihood}) + \left(w2 \times \frac{1}{t_{waiting}}\right) \quad (1)$$

where w1 and w2 are weights determined by whether user cares more about getting a spot, or getting a spot quickly. For example, on a scale of 1 to 10, w1 can indicate how important it is to a user to get a spot without necessarily caring how long it takes to get the spot, and on a scale from 1 to 10, w2 indicates how important it is to a user to get a spot quickly (e.g., within 1 minute of arrival).

Likelihood is a learned value determined by one or more algorithms based on the behavior of people in a particular location between a first time (time A) and a second time (time B), and can be represented as a percentage (out of 100). For example, the likelihood value will be logic based, and take into account how many people go out, how many spaces open up, and the time for spaces to become vacant within a given time period. $t_{waiting}$ represents a waiting time based on time of day during which a spot is sought, and what is known about when the people in a given location vacate spots. In accordance with an embodiment, spots are ranked and presented to a user seeking a spot according to their scores.

In order to help drivers quickly put their vehicle in a small spot (e.g., between two vehicles with a small distance between the two vehicles), an embodiment of the present invention includes a monitoring system 109 that, based on input from the one or more sensors 102-1, 102-2, . . . , 102-K, estimates the best trajectory in which to orient the vehicle when parking, and provides the driver with a visual feedback (e.g., on a display screen) on how to move the vehicle with the trajectory (e.g., the visual feedback can inform a driver to adjust a position of the vehicle in different directions).

In accordance with an embodiment of the present invention, in the system 100, the availability module 106 identifies one or more spaces in which to park a vehicle, and selects valid spaces from the identified one or more spaces based on a validation criteria. The ranking module 112 ranks the valid spaces and provides a ranked list of the valid spaces to the user 116.

The validation criteria can include, for example, a size of a parking space, a distance from a parking space to a target location, a time of availability of a parking space, a proximity of a parking space to an obstacle and/or a restriction preventing legal parking in a space.

The availability module 106 compares the size of a space (e.g., length and width) to a size of the vehicle, and eliminates any space which is of a size that is less than or within a predetermined number of units of the size of the vehicle. "Units" herein refers to units of measurement of distance, such as, for example, inches, feet, centimeters, meters, etc. In an example, if a car is 8 feet long, the availability module can eliminate spaces that are less than 8 feet long, as well as spaces that are within 1 foot of 8 feet, thereby eliminating spaces 9 feet or less, which may be difficult or unsafe to park in by causing potential damage to the vehicle parking or vehicles or structures bordering the parking space.

The availability module can also eliminate any space that is greater than a predetermined distance from the space to a target location. For example, based on a user/driver profile, the user may not want to park in any space that is more than 5 minutes of walking time or a predetermined distance from a desired destination. When a user informs an application of a target destination, such as, for example, a restaurant, museum, stadium, etc., the availability module can calculate the distance and/or walking time from a possible space to the target location and eliminate those spaces that are outside of the desired range.

Based on restriction information from the database 104, and the current time, the availability module 106 can determine whether a time during which the vehicle is to be parked in a space will or may overlap with any restriction preventing legal parking in the space. For example, if the current time is approaching a restriction time (such as within 30 minutes of an upcoming restriction), a warning can be sent to the user/driver indicating that a space is only valid for the next 30 minutes. The availability module 106 can further eliminate any spaces from consideration that are restricted (such as handicapped accessible spots or "no parking anytime"), and/or that overlap or are within a predetermined time of a restriction (such as "no parking from 1:00 pm to 3:00 pm" when the current time is, for example, 12:30 pm or 1:30 pm).

The availability module 106 can further eliminate any space including an obstacle preventing parking in the space.

In accordance with an embodiment, the ranking module can determine a score for each of the valid openings based on at least one user-specified preference. For example, available spots are given automatic scores based on user-specified preferences, which may be gathered through a registration process for the application. In accordance with an embodiment, if a user prefers to park in spacious spots, a value (e.g., +2, +4, +6) is added to a score as spots decrease in size in relation to the vehicle size, and depending on a strength of a preference for spacious spots. In a further example, for each additional minute of walking required to a target destination after parking, a value (e.g., +0.2, +0.4, +0.6) is added to a score, depending on strength of user preference for spots closer to a target location, and for spots deemed progressively less safe, a value (e.g., +0, +5, +10) is added based on a strength of a user preference for a safe spot. In this instance, "safe" can refer to a space that is sufficiently larger than the vehicle and/or free or substantially free of obstacles to prevent damage the vehicle upon parking. The spots can be suggested to the user in the order of lowest to highest scores.

In an embodiment, a user can be presented with, for example, the top three spots (if such exist) along with a display of characteristics of the spots, for example: (1) 10 min walk, safe, spacious; (2) 5 min walk, safe, tight; (3) 10 min walk, unsafe, spacious. A user can then select which spot he/she prefers, and transmit this information to the central server 110.

As mentioned above, the determination module 114 can determine whether a space has been offered to a second user, and eliminates the space for the first user if the space has already been offered to the second user. In this way, the system 100 is capable of avoiding a situation where two vehicles are in conflict over the same parking spot. For example, in accordance with an embodiment, where two or more users desire a spot in the same location and with one or more common attributes, a first user can enter his/her location into an application and the application finds the best suited free spot ("first parking spot") for the first user based on described attributes. Then, a second user arrives and enters his/her location into the application. Because the first parking spot was already assigned to the first user, the application (e.g., the determination module 114) will not consider the first parking spot, but will find the next best suited free spot based on the second user's attributes.

In accordance with an embodiment of the present invention, the determination module 114 can block the first parking spot so that the first parking spot is not chosen again for another user within a specified time period. If, for some reason, the first user does not park in the first parking spot within a specified threshold time (e.g., 5 minutes), the first parking spot will be unblocked and made available to other users.

In accordance with an embodiment of the present invention, user attributes are classified as hard constraints or soft constraints. Hard constraints can include, for example, vehicle size, maximum feasible distance from a target location, freedom from obstructions and legal restrictions. Soft constraints can include, for example, closeness to a target location less than a maximum feasible distance, spaciousness beyond a minimum required size for a vehicle to fit in the space, and safety considerations. If a possible spot satisfies the hard constraints, the spot is then evaluated according to soft constraints. The availability module 106 may perform evaluations under the hard and soft constraints.

Referring to FIG. 2, a flow diagram of a method for providing a user with information on spaces in which to park a vehicle, according to an embodiment of the present invention, is shown. The method 200 includes identifying one or more spaces in which to park the vehicle (block 201). In accordance with an embodiment of the present invention, identifying can include predicting an availability of a space that is not presently vacant. Predicting may be performed, for example, in accordance with processes described hereinabove in connection with the prediction module 108.

The method 200 further includes selecting valid spaces from the identified one or more spaces based on a validation criteria (block 203). The validation criteria can include, for example, a size of a space, a distance from a space to a target location, a time of availability of a space, a proximity of a space to an obstacle and/or a restriction preventing legal parking in a space. In accordance with an embodiment of the present invention, selecting can comprise any one or more the following steps. For example, selecting may include comparing the size of a space to a size of the vehicle, and eliminating any space which is of a size that is less than or within a predetermined number of units of the size of the vehicle. Selecting can also comprise eliminating any space that is greater than a predetermined distance from the space to the target location. The predetermined distance may be a specified maximum distance that a user wishes to be from a target location measured in distance units and/or average walking time from the parking space. Selecting may also include determining whether a time during which the vehicle is to be parked in a space overlaps with any restriction preventing legal parking in the space, and eliminating any space including such a restriction. Selecting can also include determining whether a space includes any obstacles, and eliminating any space including an obstacle preventing parking in the space. Selecting can also comprise determining whether a space has been offered to another user, and eliminating the space if the space has been offered to the other user.

The method 200 further includes ranking the valid spaces (block 205) and providing a ranked list of the valid spaces to a user (block 207). According to an embodiment of the present invention, ranking may comprise determining a score for each of the valid spaces based on at least one user-specified preference.

It is to be understood that in alternative embodiments, the principles outlined herein may be applied to situations other than vehicle parking. For example, it is contemplated that a system can determine for a user in advance of arriving to a venue (e.g., restaurant) whether there are openings to accommodate the user. In the restaurant scenario, for example, a user can be provided with information concerning available or soon to be available seating sufficient to accommodate a user and his/her party. The information can be based on the capacity of the restaurant, table size, seating software and/or sensors to determine whether tables are occupied or soon to be vacated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 3, in a computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

The bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 312 typically includes a variety of computer system readable media. Such media may be any available media that is accessible by computer system/server 312, and it includes both volatile and non-volatile media, removable and non-removable media.

The system memory 328 can include computer system readable media in the form of volatile memory, such as random access memory (RAM) 330 and/or cache memory 332. The computer system/server 312 may further include other removable/non-removable, volatile/nonvolatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 318 by one or more data media interfaces. As depicted and described herein, the memory 328 may include at least one program product having a set (e.g., at least one) of program modules that are configured to carry out the functions of embodiments of the invention. A program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc., one or more devices that enable a user to interact with computer system/server 312, and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for providing a user with information on spaces in which to park a vehicle, comprising:
    an availability module configured to identify one or more spaces in which to park the vehicle, and configured to select valid spaces from the identified one or more spaces based on a validation criteria, the validation criteria comprising a size of each of the identified one or more spaces; and
    a ranking module configured to rank the valid spaces and provide a ranked list of the valid spaces to the user;
    wherein the availability module is further configured to compare the size of each of the identified one or more spaces to a size of the vehicle, and eliminate any of the identified one or more spaces which is of a size that is less than or within a predetermined number of units of measurement of the size of the vehicle.

2. The system according to claim 1, wherein the validation criteria further includes at least one of a distance from a space to a target location, a time of availability of a space, a proximity of a space to an obstacle and a restriction preventing legal parking in a space.

3. The system according to claim 2, wherein the availability module is further configured to eliminate any space that is greater than a predetermined distance from the space to the target location.

4. The system according to claim 2, wherein the availability module is further configured to determine whether a time during which the vehicle is to be parked in a space overlaps with any restriction preventing legal parking in the space.

5. The system according to claim 2, wherein the availability module is further configured to eliminate any space including an obstacle preventing parking in the space.

6. The system according to claim 1, wherein the ranking module is further configured to determine a score for each of the valid spaces based on at least one user-specified preference.

7. The system according to claim 1, further comprising a determination module configured to determine whether a space has been offered to another user, and eliminate the space if the space has been offered to the other user.

8. The system according to claim 1, further comprising a prediction module configured to predict an availability of a space that is not presently vacant.

9. The system according to claim 1, further comprising one or more sensors configured to scan a predetermined area to capture at least one of an image, video, motion data, infrared data and acoustic data corresponding to the one or more spaces in which to park the vehicle.

10. The system according to claim 1, wherein the size of an identified space comprises at least one of a length and a width of the identified space.

11. A method for providing a user with information on spaces in which to park a vehicle, comprising:
    identifying one or more spaces in which to park the vehicle;
    selecting valid spaces from the identified one or more spaces based on a validation criteria, the validation criteria comprising a size of each of the identified one or more spaces;
    ranking the valid spaces and providing a ranked list of the valid spaces to the user;
    comparing the size of each of the identified one or more spaces to a size of the vehicle; and
    eliminating any of the identified one or more spaces which is of a size that is less than or within a predetermined number of units of measurement of the size of the vehicle;
    wherein the identifying, selecting, ranking, comparing and eliminating steps are performed by a computer system comprising a memory and at least one processor coupled to the memory.

12. The method according to claim 11, wherein the validation criteria further includes at least one of a distance from a space to a target location, a time of availability of a space, a proximity of a space to an obstacle and a restriction preventing legal parking in a space.

13. The method of according to claim 12, wherein the selecting comprises eliminating any space that is greater than a predetermined distance from the space to the target location.

14. The method according to claim 12, wherein the selecting comprises determining whether a time during which the vehicle is to be parked in a space overlaps with any restriction preventing legal parking in the space.

15. The method according to claim 12, wherein the selecting comprises eliminating any space including an obstacle preventing parking in the space.

16. The method according to claim 11, wherein the ranking comprises determining a score for each of the valid spaces based on at least one user-specified preference.

17. The method according to claim 11, wherein the selecting comprises determining whether a space has been offered to another user, and eliminating the space if the space has been offered to the other user.

18. The method according to claim 11, wherein the identifying comprising predicting an availability of a space that is not presently vacant.

19. The method according to claim 11, wherein the size of an identified space comprises at least one of a length and a width of the identified space.

20. A computer program product for providing a user with information on spaces in which to park a vehicle, the computer program product comprising a non-transitory computer readable storage medium having program instructions embodied therewith, the program instructions executable by a processor to cause the processor to perform a method comprising:

identifying one or more spaces in which to park the vehicle;

selecting valid spaces from the identified one or more spaces based on a validation criteria the validation criteria comprising a size of each of the identified one or more spaces;

ranking the valid spaces and providing a ranked list of the valid spaces to the user;

comparing the size of each of the identified one or more spaces to a size of the vehicle; and eliminating any of the identified one or more spaces which is of a size that is less than or within a predetermined number of units of measurement of the size of the vehicle.

\* \* \* \* \*